United States Patent Office 2,776,171
Patented Jan. 1, 1957

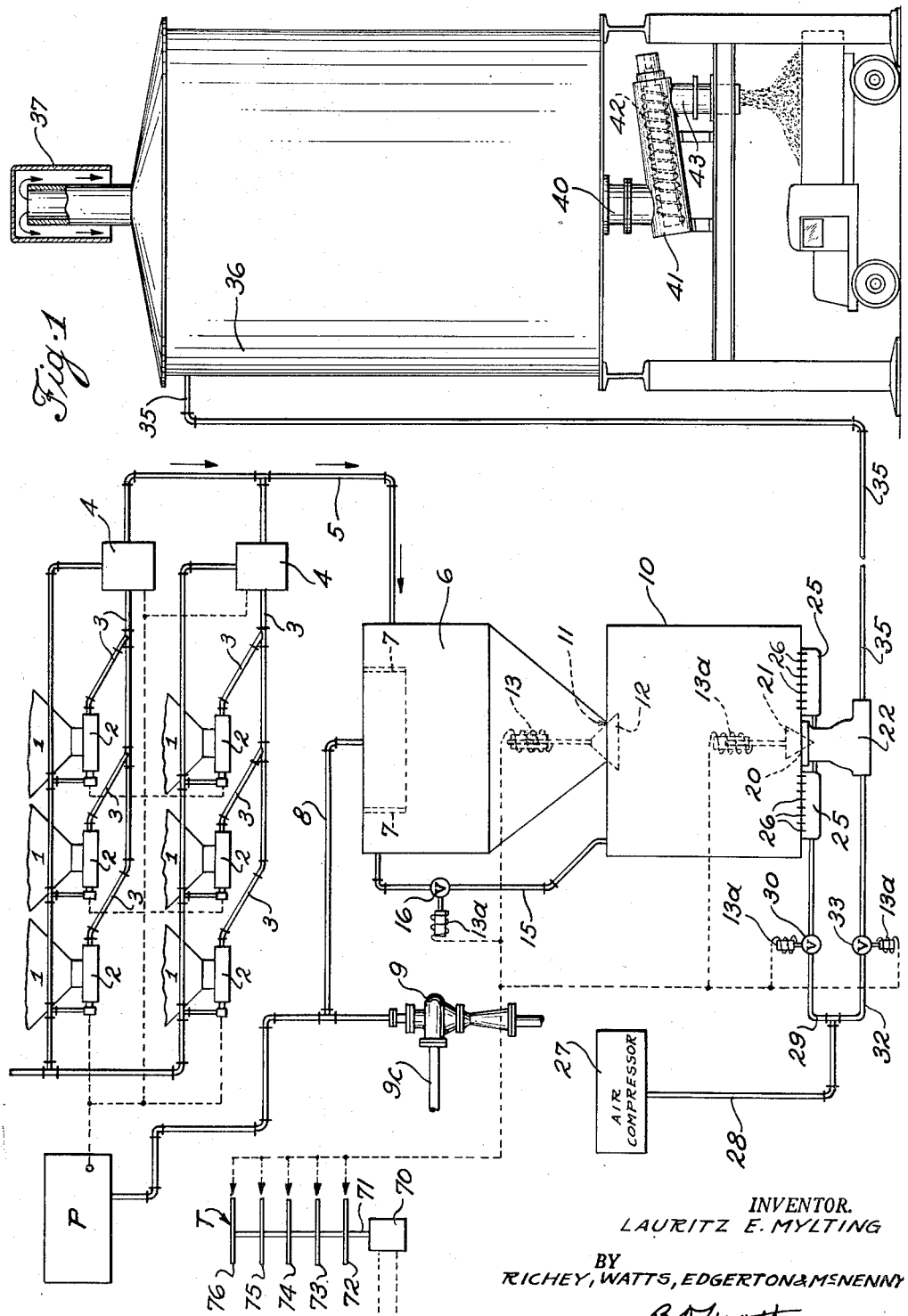

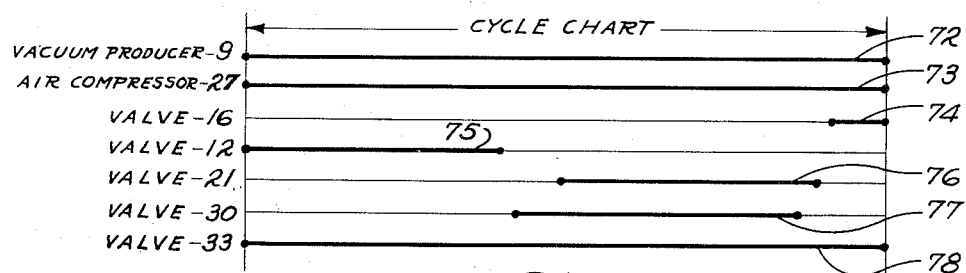
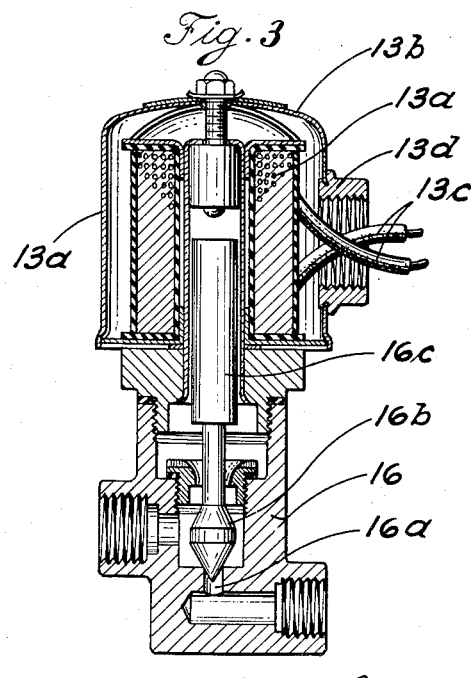
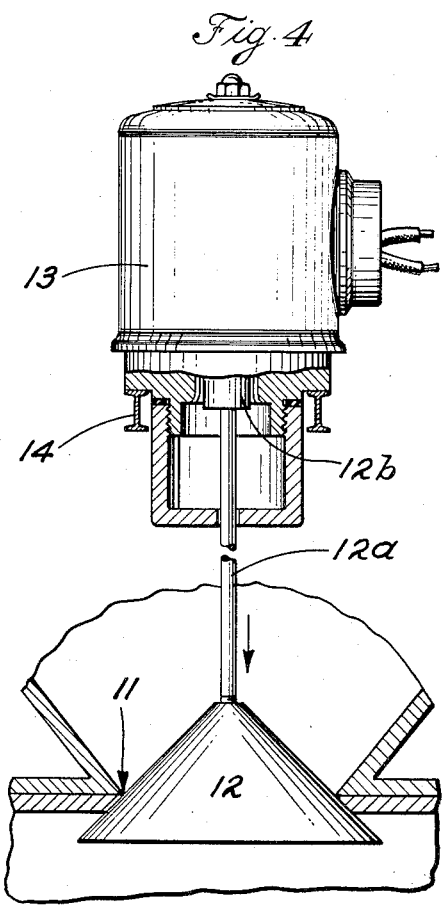
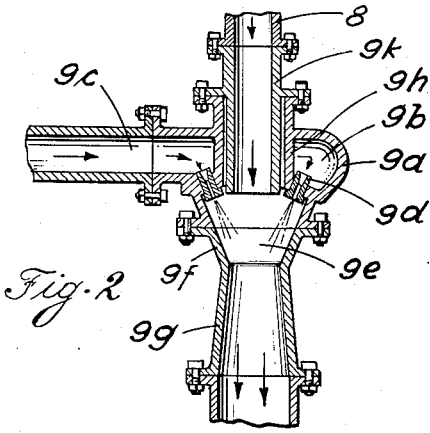

2,776,171

AUTOMATIC SOLIDS HANDLING SYSTEM

Lauritz Emil Mylting, Ardmore, Pa., assignor to The Allen-Sherman-Hoff Company, Wynnewood, Pa., a corporation of Pennsylvania Application February 16, 1954, Serial No. 410,524

6 Claims. (Cl. 302—27)

This invention relates generally to the art of handling finely divided solids and is particularly concerned with a new system of handling dust, that is solids on the order of 100 to 300 mesh.

The solids handling systems of U. S. Patents to Allen No. 2,420,217 and to Mylting No. 2,514,333 have been used commercially for quite some time. However, while superior to prior systems, they possessed certain inherent disadvantages which no one has been able to overcome prior to this invention.

One of those disadvantages was the short distance through which the solids could be transported satisfactorily and efficiently by vacuum. The capacity of a vacuum system to convey solids decreases rapidly as the distance to be traveled by the solids increases and reaches a prohibitively low capacity at distances of 400 ft. or thereabouts. To give the system the necessary efficiency, the distance between the hoppers and the cyclone separator was made as short as possible, as by mounting the separator on the storage silo and locating the latter just outside of the boiler house. That location of the silo often used space which was at a premium and could have been put to much better use, and also necessitated considerable expense in the first construction cost and in the maintenance of the silo.

Another system which has been proposed was one in which solids were to be conveyed by the release of air at high pressure into a conduit. While that system could carry solids for considerable distances, it had the important disadvantage that it required expensive apparatus at each place where the solids entered the air stream for transferring the solids from the collecting region which was at less than atmospheric pressure to the transporting region which was at, or higher than, atmospheric pressure.

The present invention utilizes the high solids carrying capacities of each of these systems while avoiding the foregoing disadvantages of both systems. This invention is embodied in a new system or apparatus consisting of a new combination of elements, some of which are old and some of which are new elements. The several elements are arranged in a new way and produce a new result which is the product of the conjoint action of the several elements.

The high solids carrying capacity of vacuum is utilized within its efficient range to carry the solids a short distance from a collecting hopper to a transfer device which may be of a size which can readily be accommodated in, or just outside of, a boiler house and convenient and close to the discharge outlets from the dust collecting hoppers. This transfer device preferably comprises a cyclone separator, a storage bin, and a discharge conduit. The dust is separated from the air in the cyclone separator and collects in the lower part of the separator. The separated dust is periodically transferred from the separator into the storage bin while the pressure in both is less than atmospheric, and then the dust is transferred from the bin into the conduit while the pressure in both is higher than atmospheric. The high solids carrying capacity of air discharged under high pressure and traveling at high velocity is then utilized within its efficient range to carry the solids through a conduit to a silo which may be located quite some distance from the boiler house on space which is not required for more important uses. The construction of the silo may be relatively inexpensive to build and maintain since it is called upon to serve merely as a bin for storing the dust until it can be delivered to railway cars, a sluiceway or some other means of disposal and need not carry the separator on the top thereof, as has been customary heretofore.

The operation of the system including the several valves of this combination of elements is controlled by an automatic timer.

The present invention will be better understood by those skilled in the art from the following description and the drawings accompanying this specification in which Fig. 1 is a diagramatic view showing one embodiment of the present invention;

Fig. 2 is a longitudinal sectional view through the vacuum creating device of Fig. 1;

Fig. 3 is a vertical central sectional view through one of the air valves of Fig. 1 and the solenoid actuator thereof;

Fig. 4 is a partly sectional view of one of the solids valves of Fig. 1 and its actuator; and Fig. 5 is a chart showing the sequence of operation of the several elements of the device of Fig. 1.

In Fig. 1 is shown a plurality of hoppers 1, dust valves 2, branch pipes 3, segregating valves 4, a pipe line 5, a separator 6, a control P, a pipe line 8 leading from the separator 6 and a vacuum creating device 9 at the discharge end of line 8. The construction and operation of the apparatus embodying these parts is described in detail in U. S. Patent No. 2,514,333 and hence, it is believed that it will suffice here to describe that apparatus briefly and as follows.

The construction of the vacuum creating device 9 is shown in Fig. 2. This device includes a housing 9a having an annular chamber 9b communicating through pipe line 9c with a source of fluid under pressure. Chamber 9b communicates through a plurality of nozzles 9d with a venturi-like chamber 9e having walls which converge and then diverge as indicated at 9f and 9g respectively. The nozzles 9d are spaced apart circumferentially by more or less equal distances and each is disposed at an angle of about approximately 22½ degrees to the longitudinal center line of chamber 9e. A circular wall 9h defines the inner periphery of chamber 9b and extends from nozzles 9d through the opposite wall of housing 9a. The pipe line 8 is attached to flange pipe 9k which is secured to the housing by bolts and which projects to a point adjacent to the nozzles 9d.

When fluid under pressure flows in pipe line 9c and is discharged through the several nozzles 9d into chamber 9e, a partial vacuum is created in pipe 9k and pipe 8 attached thereto. Continued flow of fluid under pressure through pipe line 9c extends this condition of vacuum into separator 6 and pipe lines 5 and 3. When the control P is actuated, it successively opens and closes one dust valve 2 after another until the dust has been removed from each of the hoppers 1 and discharged into separator 6. The air which flows through the dust valves 2 and carries dust from the hoppers to separator 6 is separated from the dust in the separator by a reversal of its direction of travel incident to flowing down under the annular wall 7 depending from the top of separator 6 and upwardly into pipe 8. The dust so separated from the air accumulates in the bottom of separator 6.

According to the present invention, the apparatus above described is combined with other apparatus to form a new combination of elements in which the combination produces new results not produced by any of the elements acting separately or independently and in which the several elements operate conjointly in a new manner to obtain results which are the product of the several parts acting together.

In Fig. 1, in addition to what has been described above, there is shown a bin 10 disposed beneath separator 6 with the interiors of the separator and the bin connected through an opening 11 which is controlled by a valve 12. This valve is actuated by a solenoid 13 which is supported in the separator, as by I beams 14 as shown in Fig. 4. The interior of separator 6 and bin 10 are connected by pipe 15 which is controlled by a valve 16 actuated by a solenoid 13a which is quite like solenoid 13 of Fig. 4.

The bottom wall of bin 10 is provided with an outlet opening 20 controlled by a valve 21 which is actuated by a solenoid 13a. A housing 22 is secured to the bottom of bin 10 around opening 20 to receive solids passing through that opening. Hollow closures 25 are connected to the bottom wall of bin 10 and communicate with the interior of the bin through a plurality of small openings indicated at 26.

An air compressor which may be of conventional form is indicated at 27 and is adapted to deliver air under pressure into pipe line 28 which has two branches 29 and 32. Branch 29 is provided with a valve 30 actuated by a solenoid 13a and opens into closures 25. The other branch 32 is provided with a valve 33 actuated by a solenoid 13a and opens into housing 22. Pipe line 35 leads from the side of housing 22 opposite to pipe 32 to the upper part of a storage silo 36. The roof of this silo is provided with conventional means 37 for permitting the escape of air from within the silo. The silo is also provided with a solids discharge pipe 40 which leads into a tubular housing 41 within which a screw conveyor 42 is positioned to convey solids to the outlet pipe 43 through which solids may be discharged into any suitable disposal means, for example the truck illustrated in Fig. 1.

Fig. 3 shows the details of the solenoid operated air valve 16 in pipe 15. It will be understood that valves 30 and 33 with their solenoids 13a may be like valve 16 and its actuator 13a. The valve 16 comprises a body provided with inlet and outlet openings for communication with pipe line 15, a valve seat 16a and a valve 16b engageable with the seat to shut off the flow of air through the body. The valve 16b as shown is provided with a solenoid core 16c attached to the stem of the valve and this core is partly contained within the winding 13b of solenoid 13a. This winding is preferably housed in case 13c and the leads 13d from the winding extend out through a threaded fitting 13e in the case.

In Fig. 4 are shown some details of the valve 12 which controls the opening 11 from the interior of the separator 6 into bin 10. In this case, the valve 12 is a frustrum of a cone with the apex at the top and with the side engaging a correspondingly shaped surface in the top wall of bin 10 directly below the opening 11 in the separator 6. The valve stem 12a of valve 12 carries a solenoid core 12b similar to core 16c of Fig. 3. The solenoid winding and case are like those shown in Fig. 3 and described above but the direction of current flow is reversed to the end that the valve will be held closed when the solenoid is energized.

The timer indicated at T in Fig. 1 comprises a motor 70 which preferably through a train of gears (not shown) rotates a low speed shaft 71 on which cams 72 to 78 are secured. Cams 72, 73 and 78 complete electrical circuits (partly shown) to vacuum device 9, compressor 27 and solenoid 13a of valve 33, respectively. As is shown in Fig. 5, these three circuits are constantly completed through their cams and the devices 9 and 27 run and valve 33 is open so long as those circuits are energized. Cams 74, 75, 76 and 77 complete circuits to valves 16, 12, 21 and 30, respectively, periodically and in predetermined order, and hence open those valves, as indicated on Fig. 5.

The operation of the above described system and apparatus, concisely stated, is as follows. When it is desired to move finely divided solids from hoppers 1, water is admitted through pipe line 9c into the vacuum creating device 9. In flowing through nozzles 9d and through and out of chamber 9e, a condition of reduced pressure is created in pipe line 8, in the interior of separator 6 and in pipe lines 5 and 3. Thereupon control P opens valve 2 of a hopper 1. Air flows through the valve and carries solids through lines 3 and 5 to separator 6 where the solids are collected and the air is discharged. The air compressor is started after solids have accumulated in separator 6 and delivers air under pressure into pipe line 28.

When the vacuum producing device and the air compressor are operating the motor 70 of timer T is actuated. As that motor rotates the shaft 71, cam 78 opens valve 33 and compressed air flows into housing 22 and thence through line 35 to silo 36 carrying with it any solids in the housing. At the beginning of a solids removing cycle, cam 74 completes a circuit to solenoid 13a of valve 16 which opens that valve and permits the air pressures in separator 6 and bin 10 to equalize. Since vacuum is being created by device 9, the result is a pressure in the separator and bin lower than atmospheric. The volume of bin 10 is such that the degree of vacuum in the system is not seriously reduced where valve 16 is opened, that is, the flow of solids in line 5 is not greatly reduced. As Fig. 5 indicates, valve 16 is open for only a brief period of time.

Immediately after valve 16 is closed, cam 75 interrupts the circuit to the solenoid which controls valve 12, whereupon that valve opens with resultant flow of solids from separator 6 into bin 10. When valve 12 has been open long enough for most of the solids in separator 6 to be discharged into bin 10, cam 75 restores the circuit and the solenoid closes valve 12. Immediately after valve 12 closes, cam 77 completes the circuit to the solenoid of valve 30 which opens and admits air under pressure into bin 10 through closures 25 with resultant agitation of the solids and increase of pressure to that in housing 22. Promptly after valve 30 is opened, cam 76 completes the circuit to the solenoid of valve 21 which thereupon opens. Solids are discharged into housing 22 where they are entrained by air traveling at high velocity through the housing and are carried thereby to silo 36. As Fig. 5 indicates, valve 30 is closed shortly before valve 21 closes, whereupon the air pressure in bin 10 drops by reason of the suction effect of the air flowing through housing 22.

When the solids have been removed from one hopper 1, its valve 2 is closed and the valve of another hopper is opened. This operation continues automatically until the solids have been removed from all the hoppers.

It is to be understood that, since the volume of separator 6 is small as compared to the volume of solids which accumulate in a hopper between emptying times, it may be necessary to repeat the cycle of operations of valves 16, 12, 30 and 21 several times while the solids are being removed once. However, this is an advantage for the interference with the vacuum conveying of the solids is minimized and also the solids are delivered to the high velocity air in small quantities well mixed with air which facilitates speedy transportation to the silo. Satisfactory results have been obtained when the separator has a dust holding capacity of about 25% of the dust which normally accumulates in a hopper in the ordinary collecting period of several hours.

When it is desired to remove solids from the silo 36, the screw conveyor 42 is actuated and the solids flow through pipe 40 and are conveyed to pipe 43. If desired, valves (not shown) may be included in pipes 40 and 43.

Having thus disclosed the present invention so that others skilled in the art may be able to understand and practice the same, I state that what I desire to secure by Letters Patent is defined in what is claimed.

What is claimed is:

1. Apparatus for handling finely divided solids which comprises a vacuum system for conducting solids from a supply thereof into a separator including a conduit and vacuum creating means for causing air to flow in said conduit and carry such solids from said supply through said conduit to said separator, a transfer bin having a valve-controlled inlet opening from said separator and a valve-controlled solids outlet opening, a valve-controlled, pressure-equalizing conduit connecting said separator and bin, a storage silo, a compressed air system for conducting solids from said outlet opening in the bin to said silo including a conduit leading from said outlet opening to said silo and means for compressing air and delivering it into said conduit, and automatic timing means for actuating said valves in predetermined sequence and thereby operatively connecting said systems for substantially uninterrupted transfer of solids from a source of supply to the silo.

2. Apparatus for handling finely divided solids which comprises means for creating a vacuum in a conduit to cause air to carry such solids from a supply through said conduit to said separator, a transfer bin having a valve-controlled, solids-inlet opening in its upper part from said separator, a valve-controlled, pressure-equalizing conduit connecting said separator and bin, a storage silo, an air compressor, a conduit leading from said compressor to said silo, a valve-controlled opening from said bin into the conduit to the silo, and automatic valve actuating means operatively connected to said valves for opening and closing the valve in said pressure-equalizing conduit thereby equalizing the pressure in the separator and bin, opening the valve in said first branch conduit thereby agitating solids in the bin and discharging the solids into said housing, and opening the valve in said opening thereby conducting the solids from said housing to said silo.

3. Apparatus for handling divided solids which comprises a cyclone separator, a conduit leading from a supply of finely divided solids to said separator, vacuum creating means to cause air to carry such solids from said supply through said conduit to said separator, a transfer bin having a valve-controlled, solids-inlet opening in its upper part from the lower part of said separator, a valve-controlled, pressure-equalizing conduit connecting said separator and bin, a storage silo, an air compressor, a conduit leading from said compressor to said silo, a valve-controlled opening from said bin into the conduit, to the silo, and timing means operatively connected to and automatically actuating the said valves in predetermined sequence for transferring solids from the separator through the bin and into the silo.

4. Apparatus for handling finely divided solids which comprises a cyclone separator, a conduit leading from a supply of finely divided solids to said separator, vacuum creating means to cause air to carry such solids from said supply through said conduit to said separator, a transfer bin having a valve-controlled, solids-inlet opening in its upper part from the lower part of said separator, a valve-controlled, pressure-equalizing conduit connecting said separator and bin, a storage silo, an air compressor, a conduit leading from said compressor to said silo, a valve-controlled opening from said bin into the conduit to said silo, and automatic valve actuating means operatively connected to said valves for actuating the valve in said pressure equalizing conduit thereby equalizing the pressure in the separator and bin, actuating the valve in said separator to discharge solids into said bin, and actuating the valve in the bin thereby discharging the solids into the conduit from the bin to the silo.

5. Apparatus for handling finely divided solids which comprises a cyclone separator, a conduit leading from a supply of finely divided solids to said separator, vacuum creating means to cause air to carry such solids from said supply through said conduit to said separator, a transfer bin having a valve-controlled, solids-inlet opening in its upper part from the lower part of said separator, a valve-controlled, pressure-equalizing conduit connecting said separator and bin, a storage silo, an air compressor, a conduit leading from said compressor to said silo, a valve controlled opening from said bin into said conduit, and means for transferring said solids from said separator through said bin to said silo, said means including automatic valve actuating means operatively connected to said valves for opening and closing the valve in said pressure equalizing conduit thereby equalizing the pressure in the separator and bin, then opening and closing the outlet from the separator to the bin, then opening the valve in said first branch conduit thereby discharging solids in the bin and while the last said valve is open, opening the valve in the outlet from the bin into air flowing through said housing to said silo.

6. Apparatus for handling finely divided solids which comprises a cyclone separator, a conduit leading from a supply of finely divided solids to said separator, vacuum creating means to cause air to carry such solids from a supply through said conduit to said separator, a transfer bin having a valve-controlled, solids-inlet opening in its upper part from the lower part of said separator and a valve-controlled solids-outlet opening in its lower part, a housing about said outlet opening, a valve-controlled, pressure-equalizing conduit connecting said separator and bin, a storage silo, an air compressor, a conduit leading from said compressor having a first, valve-controlled branch communicating through a plurality of openings with the lower part of said bin, and a second, valve-controlled branch communicating with said housing, a conduit connecting said housing and said silo, and automatic valve actuating means operatively connected to said valves for actuating the valve in said pressure equalizing conduit thereby equalizing the pressure in the separator and bin, actuating the valve in the separator and thereby discharging solids into said bin, actuating the valve in said first branch conduit thereby agitating solids in the bin, actuating the valve in said bin thereby discharging solids into said housing, and actuating the valve in said opening from the bin thereby discharging solids into said housing for transfer to said silo by air flowing in the conduit from the housing to the silo.

References Cited in the file of this patent

UNITED STATES PATENTS

| 1,970,405 | Thomas | Aug. 14, 1934 |
| 2,035,410 | Smith | Mar. 24, 1936 |
| 2,514,333 | Mylting | July 4, 1950 |
| 2,657,100 | Weller | Oct. 27, 1953 |